United States Patent
Murschall et al.

(10) Patent No.: US 7,090,915 B2
(45) Date of Patent: *Aug. 15, 2006

(54) OPAQUE, WHITE UV-STABILIZED LOW-FLAMMABILITY FILM WITH LOW TRANSPARENCY MADE FROM A CRYSTALLIZABLE THERMOPLASTIC

(75) Inventors: Ursula Murschall, Nierstein (DE); Ulrich Kern, Ingelheim (DE); Guenther Crass, Taunusstein (DE); Klaus Oberlaender, Wiesbaden (DE)

(73) Assignee: Mitsubishi Polyester Film GmbH, Wiesbaden (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/767,057

(22) Filed: Jan. 22, 2001

(65) Prior Publication Data
US 2003/0017317 A1  Jan. 23, 2003

(30) Foreign Application Priority Data
Feb. 19, 2000 (DE) ............................ 100 07 672

(51) Int. Cl.
B32B 1/08 (2006.01)
B32B 7/02 (2006.01)
B32B 27/32 (2006.01)
B32B 27/06 (2006.01)
C08J 3/20 (2006.01)

(52) U.S. Cl. .............. 428/220; 428/213; 428/480; 428/488.11; 428/500; 523/351; 524/423

(58) Field of Classification Search ............ 428/220, 428/136, 357, 480, 475.2, 488.1, 690, 213, 428/488.11, 500; 442/147, 131, 136; 523/351; 524/423
See application file for complete search history.

(56) References Cited

U.S. PATENT DOCUMENTS

| 4,780,402 A |   | 10/1988 | Remmington |   |
|---|---|---|---|---|
| 4,921,670 A |   | 5/1990 | Dallmann et al. |   |
| 5,178,943 A | * | 1/1993 | Asai et al. | 428/330 |
| 5,660,931 A | * | 8/1997 | Kim et al. | 428/357 |
| 5,683,793 A | * | 11/1997 | Malhotra et al. | 347/105 |
| 5,972,445 A |   | 10/1999 | Kimura et al. |   |
| 6,106,924 A | * | 8/2000 | Yamazaki | 428/105 |
| 6,270,888 B1 | * | 8/2001 | Rutter et al. | 428/347 |
| 6,309,987 B1 | * | 10/2001 | Srinivasan | 428/920 |
| 6,410,122 B1 | * | 6/2002 | Tono et al. | 428/212 |
| 6,521,351 B1 | * | 2/2003 | Murschall et al. | 428/480 |
| 6,872,446 B1 | * | 3/2005 | Murschall et al. | 428/304.4 |
| 6,939,600 B1 | * | 9/2005 | Murschall et al. | 428/212 |

FOREIGN PATENT DOCUMENTS

| DE | 23 46 787 | 3/1975 |
| EP | A 0620 245 | 10/1994 |
| EP | 0 857 749 A1 | 8/1998 |

OTHER PUBLICATIONS

Sybil P. Parker, McGraw-Hill Dictionary of Chemical Terms, p. 340.*

* cited by examiner

*Primary Examiner*—Rena Dye
*Assistant Examiner*—Lawrence Ferguson
(74) *Attorney, Agent, or Firm*—ProPat, L.L.C.

(57) ABSTRACT

The present invention relates to an opaque, white UV-stabilized low-flammability film with a thickness of from 10 to 500 μm whose principal constituent is a crystallizable thermoplastic. It also comprises at least barium sulfate as pigment, at least one flame retardant, at least one UV stabilizer as light stabilizer and at least one optical brightener. The barium sulfate and/or the optical brightener and/or the flame retardant and/or the UV stabilizer here is either incorporated directly into the thermoplastic when the polymer is prepared or fed to the thermoplastic as a masterbatch during film production. The novel film is particularly suitable for interior decoration, for constructing exhibition stands, for exhibition requisites, for displays, for placards, for labels, for protective glazing of machines or of vehicles, in the lighting sector, in the fitting out of shops or of stores, as a promotional requisite or a laminating material, or in applications associated with food or drink, and also for outdoor applications, such as roofing systems, external cladding, protective coverings, applications in the construction sector, or illuminated advertising profiles, or in the transport sector, or else for electrical applications.

16 Claims, No Drawings

OPAQUE, WHITE UV-STABILIZED LOW-FLAMMABILITY FILM WITH LOW TRANSPARENCY MADE FROM A CRYSTALLIZABLE THERMOPLASTIC

The invention relates to an opaque, white UV-stabilized film with low transparency made from a crystallizable thermoplastic and having a thickness of from 10 to 500 µm. The film comprises at least barium sulfate as pigment, a soluble flame retardant, an optical brightener, and also a UV stabilizer as light stabilizer, and has good orientability, low transparency, and also very good optical and mechanical properties. The invention further relates to a process for producing this film and to the use of the film.

BACKGROUND OF THE INVENTION

Opaque films with a thickness of from 10 to 500 µm are well known. None of the known films comprises any type of soluble flame retardant or any UV stabilizer as light stabilizer or any optical brightener, and neither the films nor items produced from them are therefore suitable for outdoor applications. In outdoor applications these films yellow, even after a short period, and their mechanical properties become impaired as a result of photooxidative degradation of the thermoplastic by sunlight. The films also fail to comply with the fire tests of DIN 4102 Part 2 and Part 1, and also fail the UL 94 test.

EP-A-0 620 245 describes films with improved heat resistance. These films comprise antioxidants suitable for scavenging free radicals formed in the film and for degrading any peroxide formed. However, this specification makes no proposal as to how the UV resistance of films of this type may be improved.

DE-A 23 46 787 describes a low-flammability polymer. Besides the polymer, the claims also cover the use of the polymer to give films and fibers. However, when films were produced from this phospholane-modified polymer the following shortcomings were apparent:

The polymer is very susceptible to hydrolysis and has to be very thoroughly predried. When the polymer is dried using dryers of the prior art it cakes, and if production of a film is possible at all it is possible only under very difficult conditions.

The films produced, under extreme and uneconomic conditions, embrittle at high temperatures, that is to say their mechanical properties decline sharply as a result of substantial embrittlement, making the film unusable. This embrittlement arises after as little as 48 hours at high temperature.

DESCRIPTION OF THE INVENTION

The object of the present invention was to provide an opaque, white low-flammability film with a thickness of from 10 to 500 µm which, besides having good orientability, good mechanical properties and good optical properties and a low Yellowness Index, above all has high UV resistance and offers a high level of protection from light and, in particular, does not embrittle when exposed to high temperatures.

For the purposes of the present invention, low flammability means that the opaque white film complies with the conditions of DIN 4102, Part 2 and in particular the conditions of DIN 4102, Part 1 in tests known as fire-protection tests, and can be assigned to construction materials class B2, and in particular B1, for low-flammability materials.

The film should also pass the UL 94 test "Vertical Burning Test for Flammability of Plastic Material", so that it can be placed in class 94 VTM-0. This means that the film is no longer burning 10 seconds after removal of a Bunsen burner, and that after 30 seconds there is no smoldering, and also that there are no drops of burning material.

For the purposes of the present invention, high UV resistance means that the films suffer no damage or extremely little damage when exposed to sunlight or other UV radiation, and therefore that the films are suitable for outdoor applications and/or critical indoor applications. In particular, when the films are used outdoors for a number of years they should in particular not yellow, nor become brittle and not have surface-cracking, and also have unimpaired mechanical properties. High UV resistance therefore implies that the film absorbs the UV light and does not transmit light until the visible region has been reached.

The good optical properties include uniform, streak-free coloration over the entire length and width of the film, low luminous transmittance/transparency ($\leq 40\%$), acceptable surface gloss ($\geq 10$), and also a low Yellowness Index (dependent on thickness, $\leq 45$ for 250 µm films and $\leq 20$ for 50 µm films).

The good mechanical properties include a high modulus of elasticity (EMD$\geq$3300 N/mm2; ETD$\geq$4200 N/mm2), and also good tear strengths (in MD$\geq$120 N/mm2; in TD$\geq$170 N/mm2) and good longitudinal and transverse elongations at break (in MD>120%; in TD$\geq$50%).

Good orientability includes excellent capabilities of the film for orientation during its production, both longitudinally and transversely, without break-offs.

Cost-effective production conditions include the capability of the polymers, and of any other raw material components required for producing the low-flammability film, to be dried with industrial dryers which comply with the prior art. It is important that these raw materials do not cake or undergo thermal degradation. These industrial dryers of the prior art include vacuum dryers, fluidized-bed dryers, and fixed-bed dryers (tower dryers), and they operate at temperatures of from 100 to 170° C., at which the flame-retardant polymers known hitherto cake and have to be removed by methods used in mining, making film production impossible.

In the vacuum dryer, which has the most gentle drying action, the raw material passes through a range of temperature of from about 30 to 130° C. at a pressure of 50 mbar. A process known as post-drying is then required, in a hopper at temperatures of from 100 to 130° C. with a residence time of from 3 to 6 hours. Even in this process, the known polymer cakes to an extreme extent.

For the purposes of the present invention, no embrittlement on exposure to high temperature for a short period means that after 100 hours at 100° C. in a circulating-air drying cabinet the film has not embrittled and does not have poor mechanical properties.

The novel film should moreover be recyclable, that is to say that any cut material arising during continuous film production can be fed back into the production operation as regrind, in particular without loss of optical or mechanical properties from the film, so that it can still be used for interior applications and in constructing exhibition stands, for example.

This object is achieved by an opaque white film with a thickness of from 10 to 500 µm whose principal constituent is a crystallizable thermoplastic, wherein the film comprises at least barium sulfate as pigment, at least one soluble flame retardant, at least one UV stabilizer as light stabilizer and at least one optical brightener.

The novel film comprises, as principal constituent, a crystallizable thermoplastic. Examples of suitable crystallizable or semicrystalline thermoplastics are polyethylene terephthalate, polybutylene terephthalate and polyethylene naphthalate, and preference is given to polyethylene terephthalate.

For the purposes of the present invention, a crystallizable thermoplastic is
a crystallizable homopolymer;
a crystallizable copolymer;
a crystallizable compound;
a crystallizable recycled material, or
another type of crystallizable thermoplastic.

The novel film may have one layer, or else two or more layers, and it may have been coated with various copolyesters or with adhesion promoters.

The novel film comprises at least one UV stabilizer as light stabilizer, and this is appropriately fed by way of what is known as masterbatch technology directly during film production, and the amount of UV stabilizer here is preferably from 0.01 to 5% by weight, based on the weight of the crystallizable thermoplastic.

The film comprises at least barium sulfate as pigment, and the amount of pigment here is preferably from 0.2 to 40% by weight, based on the weight of the crystallizable thermoplastic. The barium sulfate is preferably fed to the thermoplastic by way of what is known as masterbatch technology during film production.

The film comprises at least one optical brightener, and the amount of the optical brightener used here is from 10 to 50,000 ppm, in particular from 20 to 30,000 ppm, particularly preferably from 50 to 25,000 ppm, based on the weight of the crystallizable thermoplastic. It is preferable for the optical brightener, too, to be fed to the thermoplastic by way of what is known as masterbatch technology during film production.

The novel film comprises at least one flame retardant, which is fed by way of what is known as masterbatch technology directly during film production, and the amount of flame retardant here is from 0.5 to 30.0% by weight, preferably from 1.0 to 20.0% by weight, based on the weight of the layer of the crystallizable thermoplastic. The ratio of flame retardant to thermoplastic is generally kept at from 60:40 to 10:90% by weight during preparation of the masterbatch.

Typical flame retardants include bromine compounds, chloroparaffins and other chlorine compounds, antimony trioxide, and alumina trihydrates, but the use of the halogen compounds here is disadvantageous due to the occurrence of halogen-containing byproducts. The low light resistance of films provided with these materials is moreover a great disadvantage, as is the evolution of hydrogen halides in the event of a fire.

Examples of suitable flame retardants used according to the invention are organic phosphorus compounds, such as carboxyphosphinic acids, anhydrides of these and dimethyl methylphosphonate. A substantive factor according to the invention is that the organic phosphorus compound is soluble in the thermoplastic, since otherwise the optical properties required are not complied with.

Since the flame retardants generally have some susceptibility to hydrolysis, the additional use of a hydrolysis stabilizer may be desirable.

The hydrolysis stabilizers used are generally amounts of from 0.01 to 1.0% by weight of phenolic stabilizers, the alkali metal or alkaline earth metal stearates and/or the alkali metal or alkaline earth metal carbonates. The amounts of phenolic stabilizers used are preferably from 0.05 to 0.6% by weight, in particular from 0.15 to 0.3% by weight, and their molar mass is preferably above 500 g/mol. Particularly advantageous compounds are pentaerythritol tetrakis-3-(3, 5-di-tert-butyl-4-hydroxyphenyl)propionate and 1,3,5-timethyl-2,4,6-tris (3,5-di-tert-butyl4-hydroxybenzyl)benzene.

Light, in particular the ultraviolet content of solar radiation, i.e. the wavelength region from 280 to 400 nm, induces degradation in thermoplastics, as a result of which their appearance changes due to color change or yellowing, and there is an adverse effect on mechanical/physical properties.

Inhibition of this photooxidative degradation is of considerable industrial and economic importance, since otherwise there are drastic limitations on the applications of many thermoplastics.

The absorption of UV light by polyethylene terephthalates, for example, starts at below 360 nm, increases markedly below 320 nm and is very pronounced at below 300 nm. Maximum absorption occurs at between 280 and 300 nm.

In the presence of oxygen it is mainly chain cleavage which occurs, but there is no crosslinking. The predominant photooxidation products in quantity terms are carbon monoxide, carbon dioxide and carboxylic acids. Besides the direct photolysis of the ester groups, consideration has to be given to oxidation reactions which likewise form carbon dioxide, via peroxide radicals.

In the photooxidation of polyethylene terephthalate there can also be cleavage of hydrogen at the position alpha to the ester groups, giving hydroperoxides and decomposition products of these, and this may be accompanied by chain cleavage (H. Day, D. M. Wiles: J. Appl. Polym. Sci 16, 1972, p. 203).

UV stabilizers, i.e. light stabilizers which are UV absorbers, are chemical compounds which can intervene in the physical and chemical processes of light-induced degradation. Carbon black and other pigments can give some protection from light. However, these substances are unsuitable for opaque white films, since they cause discoloration or color change. The only compounds suitable for opaque white films are those organic or organometallic compounds which produce no, or only extremely slight, color or color change in the thermoplastic to be stabilized. UV stabilizers suitable as light stabilizers are those which absorb at least 70%, preferably at least 80%, particularly preferably at least 90%, of the UV light in the wavelength region from 180 to 380 nm, preferably from 280 to 350 nm.

These are particularly suitable if they are thermally stable in the temperature range from 260 to 300° C., that is to say they do not decompose into cleavage products and do not cause release of gases. Examples of UV stabilizers suitable as light stabilizers are 2-hydroxybenzophenones, 2-hydroxybenzotriazoles, organonickel compounds, salicylic esters, cinnamic ester derivatives, resorcinol monobenzoates, oxanilides, hydroxybenzoic esters, and sterically hindered amines and triazines, and among these preference is given to 2-hydroxybenzotriazoles and triazines.

Another additive present in the novel film is an optical brightener. The optical brighteners according to the invention are capable of absorbing UV radiation in the region from 360 to 380 nm and of re-emitting this as longer-wavelength, visible blue-violet light.

Suitable optical brighteners are bisbenzoxazoles, phenylcoumarins and bisstearylbiphenyls, in particular phenylcoumarin, and particularly preferably triazine phenylcoumarins, which are obtainable as the product ®Tinopal from Ciba-Geigy, Basle, Switzerland, or else ®Hostalux KS (Clariant, Germany), or else ®Eastobrite OB-1 (Eastman).

Besides the optical brightener, blue dyes soluble in polyester may also be added if this is useful. Dyes which have proven successful are cobalt blue, ultramarine blue and anthraquinone dyes, in particular Sudan Blue 2 (BASF, Ludwigshafen, Germany).

The amounts of the blue dyes used are from 10 to 10,000 ppm, in particular from 20 to 5000 ppm, particularly preferably from 50 to 1000 ppm, based on the weight of the crystallizable thermoplastic.

It was highly surprising that the use of the abovementioned combination of barium sulfate, UV stabilizer, soluble flame retardant, optical brightener and, if present, blue dyes in the films gave the desired result. The skilled worker would probably have begun by attempting to achieve some degree of UV resistance using an antioxidant, but would have found that the film rapidly yellows on weathering.

In the knowledge that UV stabilizers absorb UV light and therefore provide protection, the skilled worker would be likely to have used commercially available UV stabilizers, and would then have observed that the UV stabilizer has unsatisfactory thermal stability and at temperatures of from 200 to 240° C. decomposes or releases gases, and large amounts (from about 10 to 15% by weight) of the UV stabilizer have to be incorporated so that the UV light is adequately absorbed and the film therefore not damaged.

At these high concentrations it would have been observed that the film is yellow straightaway after it has been produced, with Yellowness Index deviations (YID) around 25. It would also have been observed that its mechanical properties are adversely affected. Orientation would have produced exceptional problems, such as break-offs due to unsatisfactory strength, i.e. modulus of elasticity, die deposits, causing profile variations, roller deposits from the UV stabilizer, causing impairment of optical properties (poor haze, defective adhesion, nonuniform surface), and deposits in stretching frames or heat-setting frames, dropping onto the film.

It was therefore more than surprising that even low concentrations of the combination according to the invention achieves excellent UV protection. It was very surprising that, together with this excellent UV protection, and due to the synergist action of the additives the Yellowness Index of the film is not higher than that of an unstabilized film but lower, that is to say the film is whiter, there are no releases of gases, no die deposits and no frame condensation, and the film therefore has excellent optical properties and excellent profile and layflat, and the UV-stabilized film has excellent stretchability, and can therefore be produced in a reliable and stable manner on high-speed film lines at speeds of up to 420 m/min.

The novel opaque white film is therefore also cost-effective.

It was more than surprising that by using masterbatch technology a suitable predrying and/or precrystallization procedure and, if desired, using small amounts of a hydrolysis stabilizer, it is possible to produce a low-flammability film with the required property profile in a cost-effective manner and without any caking in the dryer, and that at exposure to high temperature the film does not become brittle, and does not break when folded.

It was very surprising that, together with this excellent result and with the flame retardancy required and with the high UV resistance within the accuracy of measurement, there is no adverse effect on the Yellowness Index of the film, compared with that of an unmodified film, there are no releases of gases, no die deposits and no frame condensation, and the film therefore has excellent optical properties and excellent profile and layflat, and the low-flammability UV-stabilized film has excellent stretchability, and can therefore be produced in a reliable and stable manner on high-speed film lines at speeds of up to 420 m/min.

It is also very surprising that the cut film material can also be reused as regrind for production of the film without any adverse effect on the Yellowness Index of the film.

A preferred embodiment uses precipitated grades of barium sulfate. Precipitated barium sulfate is obtained as a fine-particle colorless powder from barium salts and sulfates or sulfuric acid, and the particle size of the powder can be controlled via the conditions of precipitation. Precipitated barium sulfates may be prepared by the usual processes, which are described in Kunststoff-Journal 8, No. 10, 30–36 and No. 11, 36–31 (1974).

The amount of barium sulfate is appropriately from 0.2 to 40% by weight, preferably from 0.5 to 30% by weight, particularly preferably from 1 to 25% by weight, based on the weight of the thermoplastic.

The average particle size of the barium sulfate is relatively small and is preferably from 0.1 to 5 μm, particularly preferably from 0.2 to 3 μm (Sedigraph method). The density of the barium sulfate used is from 4 to 5 g/cm3.

In one particularly preferred embodiment, the novel film comprises, as principal constituent, a crystallizable polyethylene terephthalate, and also from 1 to 25% by weight of precipitated barium sulfate, appropriately with a particle diameter of from 0.4 to 1 μm, particularly preferably ®Blanc fixe XR-HX or Blanc fixe HXH from Sachtleben Chemie.

In its particularly preferred embodiment, the novel film also comprises from 0.01 to 5.0% by weight of 2-(4,6-diphenyl-1,3,5triazin-2-yl)-5-hexyloxyphenol of the formula:

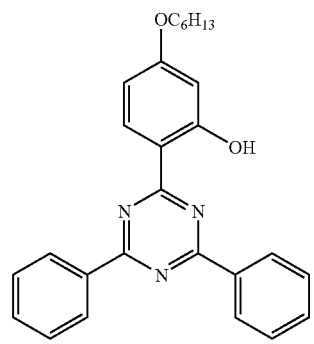

or from 0.1 to 5.0% by weight of 2,2'-methylenebis(6-(2H-benzotriazol-2-yl)-4-(1,1,2,2-tetramethylpropl)phenol of the formula:

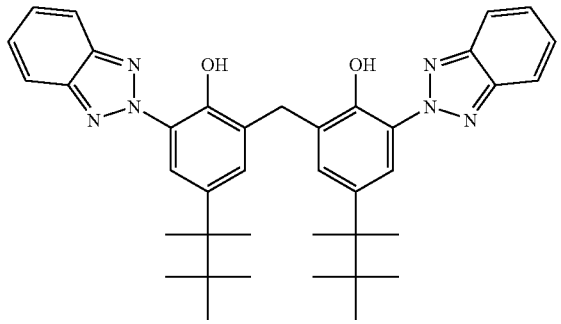

in each case based on the weight of the thermoplastic.

In another embodiment it is also possible for mixtures of the UV stabilizers mentioned or mixtures of at least one of the preferred UV stabilizers with other UV stabilizers to be used, where the total amount of light stabilizer is preferably from 0.01 to 5.0% by weight, based on the weight of the thermoplastic.

The novel film also preferably comprises from 10 to 50,000 ppm of an optical brightener soluble in the crystallizable thermoplastic, particularly preferably the triazine phenylcoumarin Tinopal (Ciba-Geigy, Basle, Switzerland), Hostalux KS (Clariant), or else Eastobrite OB-1 (Eastman).

In its particularly preferred embodiment, the novel opaque white film additionally comprises from 1 to 20% by weight of a polyethylene-terephthalate-soluble organic phosphorus compound as flame retardant, particularly preferably dimethyl methylphosphonate (ÖArmgard P 1045 from Albright and Wilson).

The surface gloss of the novel opaque white film, measured to DIN 67530 (measurement angle 20°) is greater than or equal to 10, preferably greater than or equal to 15.

The luminous transmittance (transparency) of the novel opaque white film, measured to ASTM-D 1003, is less than or equal to 30%, preferably less than or equal to 25%. The coloration is uniform and streak-free over the entire running length and width of the film.

As a result of the synergistic action of the additives barium sulfate, flame retardant, UV stabilizer, optical brightener and, if present, blue dye, the novel opaque white film is whiter, that is to say has less yellow tinge, than a film provided only with barium sulfate.

The longitudinal modulus of elasticity (ISO 527-1-2) of the novel opaque white film is greater than or equal to 3300 N/mm2, preferably greater than or equal to 3600 N/mm2. Its transverse modulus of elasticity (ISO 527-1-2) is greater than or equal to 4800 N/mm2, preferably greater than or equal to 5100 N/mm2.

The standard viscosity SV (DCA) of the polyethylene terephthalate, measured in dichloroacetic acid to DIN 53728, is from 600 to 1100, preferably from 700 to 900.

The intrinsic viscosity IV (DCA) is calculated from the standard viscosity SV (DCA) as follows:

$$IV(DCA)=6.67\cdot 10-4 SV(DCA)+0.118$$

The opaque white polyethylene terephthalate film which comprises at least barium sulfate, at least one flame retardant, at least one optical brightener, at least one UV stabilizer and, if desired, blue dyes may have either one layer or else two or more layers.

In the embodiment having two or more layers, the film has a structure of at least one core layer and at least one outer layer, and particular preference is given here to a three-layer structure of type A-B-A or A-B-C.

A substantive factor for the embodiment having two or more layers is that the polyethylene terephthalate of the core layer has a standard viscosity similar to that of the polyethylene terephthalate of the outer layer(s) which is/are adjacent to the core layer.

In one particular embodiment, the outer layers may also be composed of a polyethylene naphthalate homopolymer or of a polyethylene terephthalate-polyethylene naphthalate copolymer, or of a compound. In this particular embodiment, the thermoplastics of the outer layers likewise have a standard viscosity similar to that of the polyethylene terephthalate of the core layer.

In the embodiment having two or more layers, the barium sulfate, the flame retardant, and also the optical brightener and, if present, the blue dye are preferably present in the core layer. However, modification of the outer layers is also possible, if required.

In the embodiment having two or more layers, however, the UV stabilizer is preferably present in the outer layer(s). However, provision of UV stabilizers in the core layer is also possible, if required.

In the embodiment have two or more layers, unlike in the single-layer embodiment, the amounts given for the additives are based on the weight of the thermoplastics in the layer provided with the additive(s).

There may also be provision of a scratch-resistant coating, a copolyester or an adhesion promoter on one or more sides of the film.

Very surprisingly, weathering tests to the test specification of ISO 4892 using the Atlas Ci 65 Weather-Ometer showed that in the case of a three-layer film provision of UV stabilizers in the outer layers of from 0.5 to 2 μm thickness is entirely sufficient.

The UV-stabilized films having two or more layers and produced by known coextrusion technology are therefore of interest in economic terms when compared with fully UV-stabilized monofilms, since markedly less UV stabilizer is needed to achieve comparable UV stability.

Weathering tests have shown that, even after from 5 to 7 years in an outdoor application (extrapolated from the weathering tests) the novel UV-stabilized films generally show no increase in yellowing, no embrittlement, no loss of surface gloss, no surface cracking and no impairment of mechanical properties.

Surprisingly, fire tests to DIN 4102 Part 1 and Part 2, and also the UL 94 test, likewise showed that the novel film complies with the requirements, even at thicknesses of from 10 to 500 μm.

Measurements showed that the novel film does not become brittle during a long period of exposure to a temperature of 100° C. This result is attributable to the synergistic action of appropriate precrystallization, predrying, masterbatch technology and mixing specification.

During production of the film it was found that the UV-stabilized, flame-retardant film has excellent capability for being oriented longitudinally and transversely, without break-offs. In addition, no evolution of gas of any type was found from the UV stabilizer or from the flame retardant during the production process, and this is a substantive factor for the invention, since most UV stabilizers or flame retardants evolve undesirable and unpleasant gases at extrusion temperatures above 260° C., and are therefore of no use.

In addition, the novel film is easy to recycle without pollution of the environment and without loss of mechanical properties, making it suitable, for example, for use as short-lived promotional placards, labels or other promotional requisites.

An example of a production process for producing the novel film is extrusion on an extrusion line.

According to the invention, the flame retardant is fed by way of masterbatch technology. The flame retardant is fully dispersed in a carrier material. Carrier materials which may be used are the thermoplastic itself, e.g. the polyethylene terephthalate, or else other polymers compatible with the thermoplastic.

According to the invention, the barium sulfate, the UV stabilizer, the optical brightener and, if present, the blue dye may be incorporated directly when the thermoplastic polymer is prepared, or fed to the thermoplastic into the extruder by way of masterbatch technology during film production. It is preferable for the barium sulfate, the UV stabilizer, the optical brightener and, if present, the blue dye, and the hydrolysis stabilizer to be fed by way of masterbatch technology. The additives here are fully dispersed in a solid carrier material. Carrier materials which may be used are the thermoplastic itself, e.g. the polyethylene terephthalate, or else other polymers sufficiently compatible with the thermoplastic.

It is important that the particle size and the bulk density of the masterbatch(es) are similar to the particle size and the bulk density of the thermoplastic, so that uniform dispersion is achieved, and with this uniform UV stabilization and uniform opacity.

The polyester films may be produced by known processes from a polyester with, if desired, other polymers, and also with the optical brightener, the UV stabilizer, the flame retardant, the barium sulfate, if desired with the blue dye, and/or with a usual amount of from 0.1 to a maximum of 10% by weight of other customary additives, either in the form of monofilms or else in the form of, if desired, coextruded films having two or more layers and with identical or differently constructed surfaces, where one surface may have provision of pigment and UV stabilizer, and no pigment and/or UV stabilizer is present in the other surface. Known processes may also have been used to provide one or both surfaces of the film with a conventional functional coating.

A substantive factor for the invention is that the masterbatch which comprises the flame retardant and, if used, the hydrolysis stabilizer, is precrystallized or predried. This predrying includes gradual heating of the masterbatch at reduced pressure (from 20 to 80 mbar, preferably from 30 to 60 mbar, in particular from 40 to 50 mbar), with agitation, and, if desired, post-drying at a constant, elevated temperature, again at reduced pressure. It is preferable for the masterbatch to be charged at room temperature from a metering vessel in the desired blend together with the polymers of the base and/or outer layers, and if desired with other raw material components, batchwise into a vacuum dryer in which the temperature profile moves from 10 to 160° C., preferably from 20 to 150° C., in particular from 30 to 130° C., during the course of the drying time or residence time. During the residence time of about 6 hours, preferably 5 hours, in particular 4 hours, the polymer mixture is stirred at from 10 to 70 rpm, preferably from 15 to 65 rpm, in particular from 20 to 60 rpm. The resultant precrystallized or predried polymer mixture is post-dried in a downstream vessel, likewise evacuated, at temperatures of from 90 to 180° C., preferably from 100 to 170° C., in particular from 110 to 160° C., for from 2 to 8 hours, preferably from 3 to 7 hours, in particular from 4 to 6 hours.

In the preferred extrusion process for producing the polyester film, the molten polyester material is extruded through a slot die and quenched on a chill roll, as a substantially amorphous prefilm. This film is then reheated and stretched longitudinally and transversely, or transversely and longitudinally, or longitudinally, transversely and again longitudinally and/or transversely. According to the invention, the stretching temperatures are from Tg+10 K to Tg+60 K (where Tg is the glass transition temperature), the longitudinal stretching ratio according to the invention is from 2 to 6, in particular from 2.5 to 4.5, and the transverse stretching ratio is from 2 to 5, in particular from 3 to 4.5, and the ratio for any second longitudinal stretching carried out is from 1.1 to 3. The first longitudinal stretching may, if desired, be carried out simultaneously with the transverse stretching (simultaneous stretching). This is followed by the heat-setting of the film at oven temperatures of from 200 to 260° C., in particular from 220 to 250° C. The film is then cooled and wound up.

An entirely unexpected finding was that the process parameters for the longitudinal stretching are a variable which significantly affects the optical properties (transparency) of the film. The process parameters for the longitudinal stretching include in particular the longitudinal stretching ratio and the longitudinal stretching temperature. It was highly surprising that the transparency could be markedly affected by varying the longitudinal stretching ratio. If, for example, a film plant produces a film whose transparency is above the values according to the invention, novel films with a lower transparency can be produced by increasing the longitudinal stretching ratio during the longitudinal stretching procedure. A relative increase of 7% in the longitudinal stretching ratio gave a relative reduction of from 15 to 20% in transparency.

The surprising combination of excellent properties makes the novel film highly suitable for a variety of different applications, such as interior decoration, for constructing exhibition stands, for exhibition requisites, for displays, for placards, for labels, for protective glazing of machines or of vehicles, in the lighting sector, in the fitting out of shops or of stores, as a promotional requisite or a laminating material, or in applications associated with food or drink.

A good UV resistance of the novel film also makes it suitable for outdoor applications, e.g. for roofing systems, external cladding, protective coverings, applications in the construction sector, or illuminated advertising profiles, or in the transport sector.

The low flammability of the novel opaque white film also makes it suitable for electrical applications.

The examples below illustrate the invention in more detail.

The following standards and methods are used here when testing individual properties.

Test Methods

Surface Gloss

Surface gloss is measured with a measurement angle of 20° to DIN 67530.

Luminous Transmittance/Transparency

For the purpose of the present invention, the luminous transmittance/transparency is the ratio of total light transmitted to the amount of incident light.

Luminous transmittance is measured using "Hazegard plus" test equipment to ASTM D 1003.

Surface Defects and Uniform Coloration

Surface defects and uniform coloration are determined visually.

Mechanical Properties

The modulus of elasticity, tear strength and elongation at break are measured longitudinally and transversely to ISO 527-1-2.

SV (DCA) and IV (DCA)

The standard viscosity SV (DCA) is measured by a method based on DIN 53726 in dichloroacetic acid.

The intrinsic viscosity (IV) is calculated as follows from the standard viscosity (SV)

$$IV(DCA)=6.67\cdot 10{-4}SV(DCA)+0.118$$

Yellowness Index

The Yellowness Index YID is the deviation from the colorless condition in the "yellow" direction and is measured to DIN 6167.

Fire Performance

Fire performance is determined to DIN 4102, Part 2, construction materials class B2, and to DIN 4102, Part 1, construction materials class B1, and also by the UL 94 test.

Weathering (On Both Sides) and UV Resistance UV resistance is tested as follows to the test specification of ISO 4892

| | |
|---|---|
| Test equipment | Atlas Ci 65 Weather-Ometer |
| Test conditions | ISO 4892, i.e. artificial weathering |
| Irradiation time | 1000 hours (per side) |
| Irradiation | 0.5 W/m2, 340 nm |
| Temperature | 63° C. |
| Relative humidity | 50% |
| Xenon lamp | Internal and external filter made from borosilicate |
| Irradiation cycles | 102 minutes of UV light, then 18 minutes of UV light with water spray onto the specimens, then another 102 minutes of UV light, etc. |

In the examples and comparative examples below, each of the films is a single-layer opaque white film, produced on the extrusion line described.

Each of the films was weathered to the test specification of ISO 4892 for 1000 hours per side, using an Atlas Ci 65 Weather-Ometer, and then tested for mechanical properties, discoloration, surface defects, luminous transmittance and gloss.

The fire tests to DIN 4102, Part 2 and Part 1, and the UL 94 test, were carried out on each film.

EXAMPLE 1

An opaque white film of 50 μm thickness was produced and comprised the clear polymer polyethylene terephthalate (RT49, KoSa, Germany) as principal constituent, 18% by weight of barium sulfate (Blanc fixe XR-HX, Sachtleben Chemie) as pigment, 0.5% of UV stabilizer (OTinuvin 1577, Ciba-Geigy, Basle) as light stabilizer, 200 ppm of optical brightener (Tinopal, Ciba-Geigy, Basle), 4.0% of flame retardant (Amgard P1045, Albright & Wilson), 0.2% of hydrolysis stabilizer (1,3,5-trimethyl-2,4,6-tris(3,5-di-tert-butyl-4-hydroxybenzyl)benzene, Ciba-Geigy, Basle) and 40 ppm of blue dye (Sudan Blue 2, BASF, Ludwigshafen).

The additives barium sulfate, flame retardant, hydrolysis stabilizer, UV stabilizer, optical brightener and blue dye were added as masterbatches. The polyethylene terephthalate from which the film was produced, and the polyethylene terephthalate used for preparing the masterbatches, had a standard viscosity SV (DCA) of 810, corresponding to an intrinsic viscosity of 0.658 dl/g.

Masterbatch (1) was composed of 64% by weight of the clear polymer RT49 and 36% by weight of barium sulfate. Masterbatch (2) was composed of 20% by weight of UV stabilizer, 8000 ppm of optical brightener, 2000 ppm of blue dye and 79% by weight of clear polymer. Masterbatch (3) comprised, in addition to clear polymer, 20% by weight of flame retardant and 1% by weight of hydrolysis stabilizer.

Prior to extrusion, 50% by weight of masterbatch (1), 2.5% by weight of masterbatch (2), 2.5% by weight of masterbatch (3) and 45% by weight of clear polymer were dried at a temperature of 150° C. and then melted in the extruder. The longitudinal stretching ratio established during production of the film was precisely 3.1.

EXAMPLE 2

Example 1 was repeated, except that the longitudinal stretching ratio was reduced to 2.9.

EXAMPLE 3

The mixing specification corresponded to that of Example 1, but the longitudinal stretching ratio was increased to 3.3, while the longitudinal stretching temperatures remained unchanged.

COMPARATIVE EXAMPLE 1

Example 2 was repeated, except that no masterbatch (2) was added to the film.

COMPARATIVE EXAMPLE 2

Comparative Example 1 was repeated, except that neither masterbatch (2) nor masterbatch (3) was added to the film, and the only additive present in the film was therefore the pigment barium sulfate.

The opaque white PET films produced in Examples 1 to 3 and the films of Comparative Examples 1 and 2 had the property profiles illustrated in the table below:

TABLE

| Properties | Ex. 1 | Ex. 2 | Ex. 3 | Comp. Ex. 1 | Comp. Ex. 2 |
|---|---|---|---|---|---|
| Thickness [μm] | 50 | 50 | 50 | 50 | 50 |
| Surface gloss side 1 (Measurement angle 20°) | 20 | 19 | 21 | 20 | 20 |
| side 2 | 21 | 20 | 21 | 21 | 20 |
| Luminous transmittance/transparency [%] | 19.1 | 22.5 | 16.3 | 22.9 | 22.7 |
| Yellowness Index (YID) | 18 | 19 | 18 | 24 | 25 |
| Longitudinal modulus of elasticity [N/mm2] | 3600 | 3650 | 3500 | 3550 | 3650 |
| Transverse modulus of elasticity [N/mm2] | 5100 | 5200 | 5150 | 5100 | 5200 |
| Longitudinal tear strength [N/mm2] | 145 | 160 | 155 | 160 | 150 |
| Transverse tear strength [N/mm2] | 240 | 240 | 230 | 230 | 230 |

TABLE-continued

| Properties | Ex. 1 | Ex. 2 | Ex. 3 | Comp. Ex. 1 | Comp. Ex. 2 |
|---|---|---|---|---|---|
| Longitudinal elongation at break [%] | 185 | 190 | 185 | 185 | 180 |
| Transverse elongation at break [%] | 70 | 65 | 60 | 60 | 65 |
| Coloration | brilliant white | brilliant white | brilliant white | tinged yellow | tinged yellow |

Results of Weathering Tests

After 1000 hours of weathering per side on the Atlas Ci 65 Weather-Ometer, the appearance of the films of Examples 1 to 3 hardly differed from that of unweathered films. There was almost no change in mechanical properties when comparison was made with unweathered films. After 1000 hours of weathering per side on the Atlas Ci 65 Weather-Ometer the films of Comparative Examples 1 and 2 had surface cracks and showed embrittlement. It was therefore no longer possible to measure their property profiles precisely. The film also had visibly more yellow coloration.

Results of the Fire Test

The films of Examples 1 to 3, and also that of Comparative Example 1, comply with the requirements for construction material classes B2 and B1 of DIN 4102.

The film of Comparative Example 2 does not comply with the requirements for construction material classes B2 and B1 to DIN 4102.

What is claimed is:

1. An opaque white film with a thickness of from 10 to 500 μm, wherein the film comprises thermoplastic consisting of polyester which has been selected from the group consisting of polyethylene terephthalate, polybutylene terephthalate and polyethylene naphthalate as a main constituent, barium sulfate, at least one UV stabilizer, at least one flame retardant and at least one optical brightener, said film exhibiting a yellowness index of less than or equal to 45 for 250 micron films and less than or equal to 20 for 50 micron films.

2. The opaque white film as claimed in claim 1, wherein from 0.2 to 40% by weight of barium sulfate based on the weight of the thermoplastic, is present in the film and the barium sulfate is fed to the thermoplastic by way of masterbatch technology during film production.

3. The opaque white film as claimed in claim 1, wherein from 10 to 50,000 ppm of optical brightener, based on the weight of the thermoplastic, is present in the film and the optical brightener is fed to the thermoplastic by way of masterbatch technology during film production.

4. The opaque white film as claimed in claim 3, wherein the optical brightener has been selected from the group consisting of bisbenzoxazoles, phenylcoumarins and bis-stearylbiphenyls.

5. The opaque white film as claimed in claim 1, wherein from 0.01 to 5% by weight, based on the weight of the thermoplastic, of UV stabilizer is present as light stabilizer in the film, and the UV stabilizer has been selected from the group consisting of 2-hydroxybenzophenones, 2-hydroxybenzotriazoles, organonickel compounds, salicylic esters, cinnamic ester derivatives, resorcinol monobenzoates, oxanilides, hydroxybenzoic esters, sterically hindered amines and triazines and mixtures of these, and the UV stabilizer is fed to the thermoplastic as a masterbatch during film production.

6. The opaque white film as claimed in claim 1, wherein from 0.5 to 30.0% by weight, based on the weight of the thermoplastic, of flame retardant is present in the film, and the flame retardant has been selected from the group consisting of organic phosphorus compounds, and the flame retardant is soluble in the thermoplastic.

7. The opaque white film as claimed in claim 6, wherein the organic phosphorus compound is selected from carboxyphosphinic acids, anhydrides of these and dimethyl methylphosphonate.

8. The opaque white film as claimed in claim 1, wherein from 0.01 to 1.0% by weight of a hydrolysis stabilizer selected from the group consisting of phenolic stabilizers, the alkali metal or alkaline earth metal stearates and the alkali metal or alkaline earth metal carbonates is also present in the film.

9. The opaque white film as claimed in claim 1, wherein a polyester-soluble blue dye selected from the group consisting of cobalt blue, ultramarine blue and anthraquinone dyes, is also present in the film, and the amount of blue dye is from 10 to 10,000 ppm, based on the weight of the thermoplastic.

10. The opaque white film as claimed in claim 1, wherein the barium sulphate is present as precipitated barium sulfate in the film and is in the form of fine-particle colorless powder with an average grain size of from 0.1 to 5 μm, measured by the Sedigraph method.

11. The opaque white film as claimed in claim 1, wherein the surface gloss of the film according to DIN 67530 (measurement angle 20°) is greater than or equal to 10, and the luminous transmittance (transparency) of the film, according to ASTM-D 1003 is less than or equal to 30%.

12. The opaque white film as claimed in claim 1, wherein the film has one or more layers, wherein the film having more than one layer comprises at least one core layer and at least one outer layer.

13. The opaque white film as claimed in claim 12, wherein, in the film having more than one layer, the barium sulfate, the flame retardant and the optical brightener are present in the core layer, and the UV stabilizer is present in the outer layer(s).

14. The opaque white film as claimed in claim 13, wherein the outer layers comprise barium sulfate, flame retardant and optical brightener.

15. The opaque white film as claimed in claim 1, having a scratch-resistant coating, a copolyester or an adhesion promoter on at least one side of the film.

16. An opaque white multilayered film with a thickness of from 10 to 500 μm comprising a base layer disposed between outer layers, said film comprising barium sulfate, at least one UV stabilizer, at least one flame retardant and at least one optical brightener, said base layer comprising thermoplastic consisting of polyethylene terephthalate, said outer layers comprising thermoplastic, consisting of (i) polyethylene naphthalate homopolymer or (ii) polyethylene terephthalate-polyethylene naphthalate copolymer or compound, said film exhibiting a yellowness index of less than or equal to 45 for 250 micron films and less than or equal to 20 for 50 micron films.

* * * * *